(12) United States Patent
Danilov et al.

(10) Patent No.: US 11,748,004 B2
(45) Date of Patent: Sep. 5, 2023

(54) DATA REPLICATION USING ACTIVE AND PASSIVE DATA STORAGE MODES

(71) Applicant: EMC IP Holding Company LLC, Hopkinton, MA (US)

(72) Inventors: Mikhail Danilov, Saint Petersburg (RU); Igor Medvedev, Seattle, WA (US); Brett A. Menzies, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 782 days.

(21) Appl. No.: 16/403,417

(22) Filed: May 3, 2019

(65) Prior Publication Data
US 2020/0348865 A1 Nov. 5, 2020

(51) Int. Cl.
*G06F 3/06* (2006.01)
*G06F 11/20* (2006.01)

(52) U.S. Cl.
CPC .......... *G06F 3/0634* (2013.01); *G06F 3/0604* (2013.01); *G06F 3/065* (2013.01); *G06F 3/067* (2013.01); *G06F 3/0659* (2013.01); *G06F 11/2094* (2013.01); *G06F 2201/82* (2013.01)

(58) Field of Classification Search
CPC ...... G06F 3/0634; G06F 3/0604; G06F 3/065; G06F 3/0659; G06F 3/067; G06F 11/2094; G06F 2201/82
See application file for complete search history.

(56) References Cited

U.S. PATENT DOCUMENTS

| 4,675,869 | A | 6/1987 | Driessen |
| 5,675,802 | A | 10/1997 | Allen et al. |
| 5,805,788 | A | 9/1998 | Johnson |
| 5,950,225 | A | 9/1999 | Kleiman |
| 6,065,020 | A | 5/2000 | Dussud |
| 6,073,218 | A | 6/2000 | DeKoning et al. |
| 6,108,684 | A | 8/2000 | DeKoning et al. |
| 6,233,696 | B1 | 5/2001 | Kedem |
| 6,240,527 | B1 | 5/2001 | Schneider et al. |
| 6,502,243 | B1 | 12/2002 | Thomas |
| 6,549,921 | B1 * | 4/2003 | Ofek .................. G06F 11/2082 714/13 |
| 7,007,044 | B1 | 2/2006 | Rafert et al. |

(Continued)

OTHER PUBLICATIONS

Non-Final Office Action received for U.S. Appl. No. 16/399,897 dated Feb. 19, 2021, 56 pages.

(Continued)

*Primary Examiner* — Jigar P Patel

(74) *Attorney, Agent, or Firm* — Amin, Turocy & Watson, LLP

(57) ABSTRACT

Described herein, system that facilitates replication of data in a geographically distributed storage environment. According to an embodiment, a system can comprise determining whether a data storage system is in an active data storage mode or a passive data storage mode. In active data storage mode, the data storage system can accept connections from an application, permit the application to store new data objects, replicate the new data objects to other data storage systems, and accept replicated data. In passive data storage mode, the data storage system can block storage of new data objects by the application while accepting replicated data.

20 Claims, 10 Drawing Sheets

(56) References Cited

U.S. PATENT DOCUMENTS

| | | |
|---|---|---|
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,037,391 B1 | 10/2011 | Jung et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,924,543 B1 * | 2/2021 | Chen ................... H04L 67/1097 |
| 10,951,236 B2 | 3/2021 | Chen et al. |
| 11,023,331 B2 | 6/2021 | Danilov et al. |
| 11,150,995 B1 * | 10/2021 | Dhoolam ............ G06F 16/9535 |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0050131 A1 | 3/2005 | Lawrow |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0228828 A1 * | 9/2008 | Teodorescu ............ G06F 16/10 |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 * | 2/2011 | Augenstein ........... G06F 16/185<br>711/E12.001 |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |

(56) References Cited

U.S. PATENT DOCUMENTS

| | | |
|---|---|---|
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0006850 A1 | 1/2014 | Aliev et al. |
| 2014/0040417 A1 | 2/2014 | Galdwin et al. |
| 2014/0064048 A1 | 3/2014 | Cohen et al. |
| 2014/0082414 A1* | 3/2014 | Olster ............... G06F 11/2082 714/15 |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrier et al. |
| 2014/0359244 A1 | 12/2014 | Chambliss et al. |
| 2014/0380088 A1 | 12/2014 | Bennett et al. |
| 2014/0380093 A1* | 12/2014 | Molaro ............... G06F 11/1096 714/6.24 |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0032279 A1* | 2/2018 | Davis ............... G06F 3/0689 |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Daniliv et al. |
| 2018/0181475 A1 | 6/2018 | Danilov et al. |
| 2018/0181612 A1 | 6/2018 | Daniliv et al. |
| 2018/0217888 A1* | 8/2018 | Colgrove ............... G06F 17/40 |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1* | 10/2018 | Curley ............... G06F 3/0604 |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0266062 A1 | 8/2019 | Borlick et al. |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0081778 A1 | 3/2020 | Varanasi |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2020/0218450 A1 | 7/2020 | Danilov et al. |
| 2020/0241759 A1 | 7/2020 | Danilov et al. |

(56) References Cited

U.S. PATENT DOCUMENTS

| | | |
|---|---|---|
| 2020/0382141 A1 | 12/2020 | Wang et al. |
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 21 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.

Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/526,182 dated Nov. 24, 2021, 83 pages.
Notice of Allowance received for U.S. Appl. No. 16/888,144 dated Nov. 22, 2021, 71 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.

(56) References Cited

OTHER PUBLICATIONS

Final Office Action received for U.S. Appl. No. 16/010,255 dated Jul. 23, 2020, 36 pages.
Office Action received for U.S. Appl. No. 16/010,246 dated Jul. 27, 2020, 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177, 278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/584,800 dated Jun. 27, 2022, 33 pages.
Notice of Allowance received for U.S. Appl. No. 16/179,486 dated Jun. 8, 2022, 67 pages.
Final Office Action received for U.S. Appl. No. 16/986,222 dated Jun. 17, 2022, 76 pages.
Final Office Action received for U.S. Appl. No. 17/153,602 dated Jul. 14, 2022, 34 pages.
Final Office Action received for U.S. Appl. No. 16/538,984 dated Jun. 1, 2022, 114 pages.
Notice of Allowance received for U.S. Appl. No. 17/333,815 dated Jun. 27, 2022, 27 pages.
Wu et al., "Improving I/O Performance of Clustered Storage Systems by Adaptive Request Distribution," 2006 15th IEEE International Conference on High Performance Distributed Computing, 2006, pp. 207-217.
Notice of Allowance received for U.S. Appl. No. 16/526,182 dated May 16, 2022, 54 pages.
Non-Final Office Action received for U.S. Appl. No. 16/584,800 dated Mar. 3, 2022, 90 pages.
Notice of Allowance received for U.S. Appl. No. 17/333,793 dated Mar. 9, 2022, 39 pages.
Non-Final Office Action received for U.S. Appl. No. 17/153,602 dated Mar. 16, 2022, 40 pages.
Sun et al., "Data Management across Geographically-Distributed Autonomous Systems: Architecture, Implementation, and Performance Evaluation," IEEE Transactions on Industrial Informatics, 2019, 9 pages.
Office Action dated Sep. 3, 2021 for U.S. Appl. No. 16/803,913, 23 pages.
Office Action dated Jan. 25, 2022 for U.S. Appl. No. 16/803,913, 25 pages.
Office Action dated May 27, 2022 for U.S. Appl. No. 16/803,913, 24 pages.
RAID vs. non-RAID Storage—Difference & Comparison, https://www.fromdev.com/2014/01/raid-vs-non-raid-storage-difference.html, pp. 1-4, 2014. (Year: 2014).
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Non-Final Office Action received for U.S. Appl. No. 16/698,096 dated Jan. 5, 2022, 21 pages.

(56) References Cited

OTHER PUBLICATIONS

Notice of Allowance received for U.S. Appl. No. 16/745,855 dated Sep. 10, 2021, 37 pages.
Non- Final Office Action received for U.S. Appl. No. 17/153,602 dated Oct. 25, 2022, 40 pages.
Notice of Allowance received for U.S. Appl. No. 16/986,222 dated Oct. 13, 2022, 37 pages.
Final Office Action received for U.S. Appl. No. 16/803,913 dated Oct. 26, 2022, 102 pages.
Files Controlling User Accounts and Groups, https://access.redhat.com/documentation/en-us/red_hat_enterprise_linux/4, 2012, pp. 1-2. (Year: 2012).
Notice of Allowance dated Feb. 8, 2023 for U.S. Appl. No. 17/153,602, 27 pages.
Notice of Allowance dated Mar. 6, 2023 for U.S. Appl. No. 17/083,135, 111 pages.
Office Action dated Mar. 31, 2023 for U.S. Appl. No. 17/152,537, 95 pages.

\* cited by examiner

200

CHUNK SPACE

- OBJECT 1 SEGMENTS

- OBJECT 2 SEGMENTS

- OBJECT 3 SEGMENTS

US 11,748,004 B2

DATA REPLICATION USING ACTIVE AND PASSIVE DATA STORAGE MODES

TECHNICAL FIELD

The subject disclosure relates generally to storage systems. More specifically, this disclosure relates to various embodiments for replication of data in a geographically distributed storage environment.

BACKGROUND

The large increase in amount of data generated by digital systems has created a new set of challenges for data storage environments. Traditional storage area network (SAN) and/or network-attached storage (NAS) architectures have not been designed to support data storage and/or protection at large multi-petabyte capacity levels. Object storage technology can be utilized to meet these requirements. By utilizing object storage technology, organizations can not only keep up with rising capacity levels, but can also store these new capacity levels at a manageable cost point.

Typically, a scale-out, cluster-based, shared-nothing object storage that employs a microservices architecture pattern, for example, an ECS™ (formerly known as Elastic Cloud Storage) can be utilized as a storage environment for a new generation of workloads. ECS™ utilizes the latest trends in software architecture and development to achieve increased availability, capacity use efficiency, and performance. ECS™ uses a specific method for disk capacity management, wherein disk space is partitioned into a set of blocks of fixed size called chunks. User data is stored in these chunks and the chunks are shared. One chunk can comprise fragments of several user objects (e.g., object segments). Chunk content is modified in an append mode. When chunks become full, they are sealed, and the content of sealed chunks is immutable.

The above-described background relating to ECS™ is merely intended to provide a contextual overview of some current issues, and is not intended to be exhaustive. Other contextual information may become further apparent upon review of the following detailed description.

DETAILED DESCRIPTION

Figure 1:
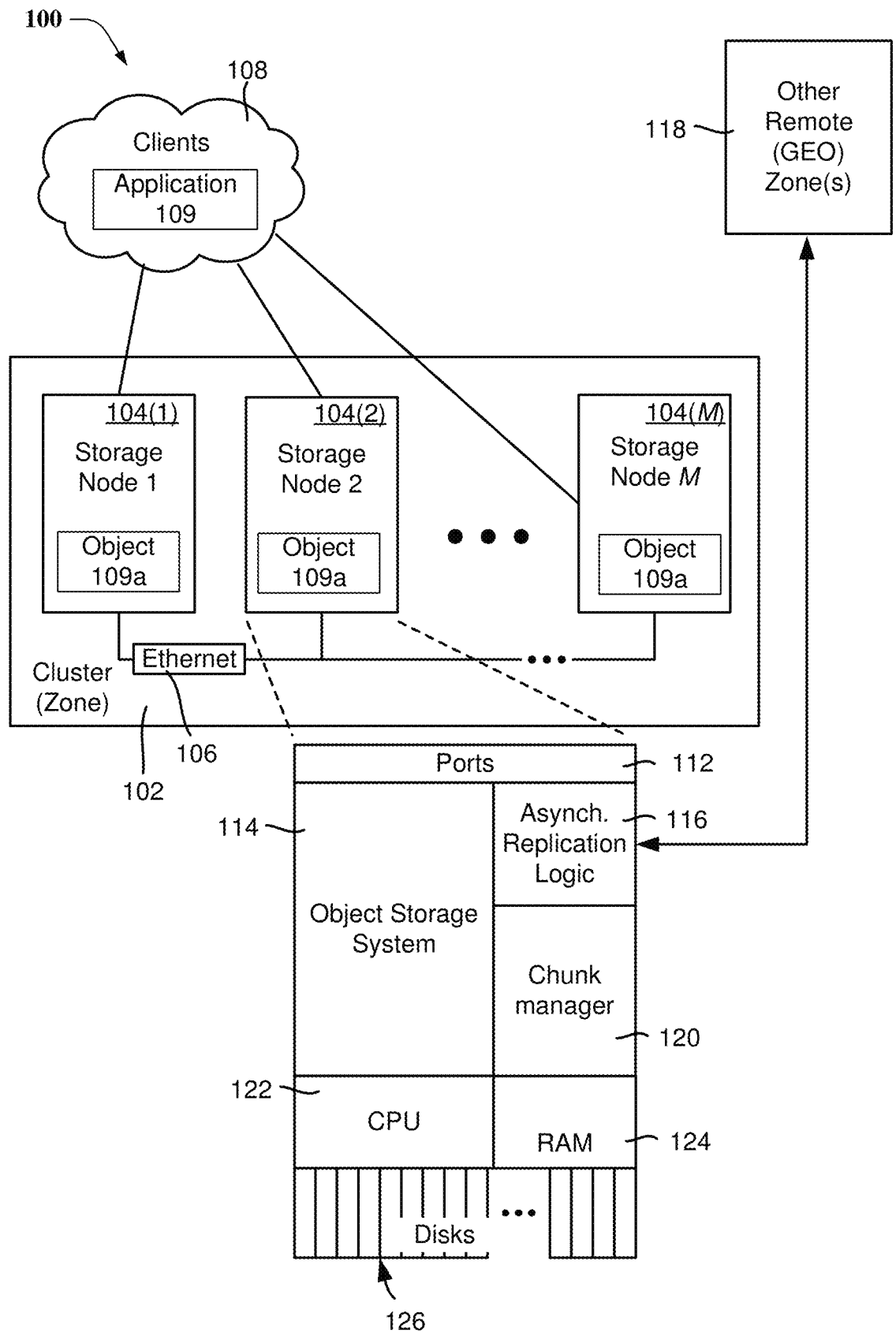
FIG. 1 illustrates an example cloud data storage system that replicates data in active and passive storage modes, according to one or more example implementations.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to cloud storage systems, such as, but not limited to an ECS™ platform. The ECS™ platform combines the cost advantages of commodity infrastructure with the reliability, availability and serviceability of traditional arrays. ECS™ supports geographically distributed setups comprising two or more sites (also referred to herein as zones). The corresponding feature is called GEO. GEO can be used to provide additional protection of user data by means of replication. At the GEO level, some ECS implementations can implement a model which can be called Active-Active, meaning any zone can update any object. This disclosure provides an alternative to Active-Active, referred to as an Active-Passive model. In an Active-Passive model, some zones are in active mode and other zones are in passive mode, as described in further detain herein. We provide an implementation of an Active-Passive model for a geographically distributed storage system like ECS.

With regard to the ECS™ platform in general, ECS™ can comprise a cluster of nodes (also referred to as "cluster" herein) that delivers scalable and simple public cloud services with the reliability and/or control of a private-cloud infrastructure. Moreover, the ECS™ platform comprises a scale-out, cluster-based, shared-nothing object storage, which employs a microservices architecture pattern. The ECS™ platform can support storage, manipulation, and/or analysis of unstructured data on a massive scale on commodity hardware. As an example, ECS™ can support mobile, cloud, big data, content-sharing, and/or social networking applications. ECS™ can be deployed as a turnkey storage appliance or as a software product that can be installed on a set of qualified commodity servers and/or disks.

The ECS™ scale-out and geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In an aspect, ECS™ does not rely on a file system for disk capacity management. Instead, ECS™ partitions disk space into a set of blocks of fixed size called chunks (e.g., having a chunk size of 128 MB). All user data is stored in these chunks and the chunks can be shared. Typically, a chunk can comprise fragments of several different user objects. The chunk content can be modified in an append-only mode. When a chunk becomes full, it can be sealed and the content of a sealed chunk is immutable. In a further aspect, a data chunk can comprise a plurality of object segments having a size of 2 MB that are appended in the data chunk. Thus, a data chunk of size 128 MB can have 64 object segments appended together. In general operation, a read request comprises a request to read (e.g., extract) a single object segment.

In an aspect, ECS™ is a cloud storage system that supports geographically distributed setups comprising two or more zones (e.g. sites). The corresponding feature is called GEO. GEO can be used to provide an additional protection of user data by means of replication. The replication mechanism can work at the chunks level, although it can also serve object-oriented goals. In an aspect, a chunk with data can be replicated to multiple remote sites. ECS™ can use GEO erasure coding techniques to minimize capacity overhead associated with GEO data protection. Although the systems and methods disclosed herein have been described with respect to object storage systems (e.g., ECS™), it is noted that the subject specification is not limited to object storage systems and can be utilized for most any storage systems. Thus, any of the embodiments, aspects, concepts, structures, functionalities or examples described herein are non-limiting, and the technology may be used in various ways that provide benefits and advantages in computing and data storage in general.

The GEO system is capable of employing, e.g., a replication to single site mode, a replication to all sites mode, or a replication to one or more regions mode depending on geographical considerations (e.g., distance and government rules on storing data), site or region storage size considerations (e.g., a site limited to storing 100 million data chunks). In a GEO system according to some embodiments, data chunks are continuously added to sites. In a GEO setup according to an aspect, a backup copy of the data chunk is created.

In an aspect, a replication to one site mode comprises replicating a backup copy of a data chunk at a single site (discussed in FIG. 3, below). For example, the data chunk is created at a primary site and a backup is stored at secondary site. In an aspect, a replication to all sites mode comprises replicating a backup copy of a data chunk at every site within the GEO system (discussed in FIG. 4). When a data storage a site reaches capacity, new sites are created. In an aspect, when a number of sites in a GEO setup reaches a threshold (e.g., 100 sites), the sites are divided into M regions, wherein one region can unite two or more sites (e.g., 50 regions, each having two sites). The regions can be based on geographical location. For example, the regions can by based on city, state, country, etc. The regions can be based on zip codes or any other suitable method to divide sites. In an aspect, a replication to one or more regions mode can comprise replicating a data chunk to one or more regions (discussed in FIG. 5). In some embodiments, the data chunk can be replicated at, e.g., a single respective site of each of multiple respective regions. The advantage of replicating at region level is that it provides greater reliability of accessing the data chunk during site failure while storing the data chunks at fewer sites, thereby reducing storage resources. In some embodiments, chunks containing data associated with a particular application can be replicated in order to replicate the corresponding objects of the application.

ECS™ supports temporary unavailability of GEO zones. When a zone is temporarily unavailable we say that the zone is in temporary site outage (TSO) mode. Support for TSOs is accomplished in part through object management. Geographically distributed ECS™ setups maintain a global namespace and assure strong consistency for user data. This is achieved via defining a primary zone for each object. Normally, the primary zone is a zone that created an object. Then, we say that the primary zone owns the object or that the primary zone is the owner of the object. All requests related to the object can be handled by the zone that owns it.

When a zone that owns some object enters TSO mode, a new owner can be elected for the object. Note that every available zone of the GEO setup can become the owner. In the general case, a new object owner can facilitate update of the object. This means a potential conflict after the original owner of the object becomes available again. The system runs through a reconciliation phase to resolve conflicts. The ECS's conflict resolution strategy is very simple: choose a latest object update and discard potentially conflicting object updates.

In an ECS™ GEO model referred to as Active-Active, as noted herein, any zone can update any object. There are some drawbacks to the Active-Active model, for example, it provides a great deal of freedom for applications, which can connect to any zone of a GEO setup for data access. There is a price to pay for this freedom. In order to keep object conflict resolution simple, the Active-Active model encounters difficulty in supporting simultaneous TSO for two or more zones of a GEO setup.

Aspects of this disclosure provide an Active-Passive model, which can be deployed in cloud systems such as ECS™. An example Active-Passive model setup can include two or more regions, with each region in either active mode or passive mode. Each region can comprise multiple sites (zones). Applications can primarily work with the active sites (the sites from the active regions), and applications can have limited or no access to passive sites. Applications are free to automatically switch between the active sites. Applications switches to sites in passive regions can be restricted, e.g., requiring reconfiguration by a system administrator in order to allow application switches to sites in passive regions.

Potential aspects of Active-Passive model GEO setups include, e.g., in case of a misconfiguration of an application, the application can fail to access a passive region. Furthermore, Active-Passive model GEO setups can support up to N sites in TSO mode, where N is the number of regions and no more than one site from each region is in TSO mode. Furthermore, Active-Passive model GEO setups support high availability/disaster recovery (HA/DR) replication (discussed in FIG. 6). Backup copy(s) of user data can be created within active region(s) for HA replication. Backup copy(s) of user data can be created within passive region(s) for DR replication. This reduces resource demands in comparison to, e.g., capacity-intensive replication to all sites arrangements, while also providing sufficient backup copies of user data.

In an example Active-Passive model, a mode a given site operates in can be explicitly specified. There are two modes: Active and Passive. Active sites, sites in active mode, can accept data connections from applications. Passive sites, sites in passive mode, can be promoted to active mode in order to accept data connections from applications. In some optional embodiments, passive sites can be allowed to accept data connections from applications, but passive sites are not allowed to serve data creation/update requests. This option can be used for example to organize read failover during a temporary region outage (TRO).

In the Active-Passive model, data handling during and after TSO can include refusing "eligibility" and "positive suffrage" to sites in passive mode. In other words, unless it switches to active mode, a passive site cannot become an owner of data created within an active site. A passive site also cannot participate in election of a new owner. As a result, the Active-Passive model can allow two sites from different regions to enter TSO mode. Indeed, a passive site in TSO mode need not impact ownership transition for user data. Furthermore, a passive site in TSO need not impact reconciliation procedures after an active site exits TSO. Passive sites cannot store unique data updates, so active sites can negotiate an effective data version between themselves using any applicable conflict resolution policy, e.g. the ECS's "latest update wins" policy.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 shows part of a cloud data storage system such as ECS™ comprising a zone (e.g., cluster) 102 of storage nodes 104(1)-104(M), in which each node is typically a server configured primarily to serve objects, such as object 109a, in response to client requests (e.g., requests received from application 109). The nodes 104(1)-104(M) can be coupled to each other via a suitable data communications link comprising interfaces and protocols such as, but not limited to, Ethernet block 106.

Clients 108, and in particular, an application 109 at one or more of the clients 108, can send data system-related requests to the cluster 102, which in general is configured as one large object namespace; there can be on the order of billions of objects such as 109a maintained in a cluster 102, for example. Application 109 can for example create object 109a at any of nodes 104(1)-104(M), in which case object 109a may be referred to as a "new object 109a", or application 109 can request a previously created object 109a from any of nodes 104(1)-104(M), in which case object 109a can be referred to as a "stored object 109a". To this end, a node such as the node 104(2) generally comprises ports 112 by which clients connect to the cloud storage system. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), includes an instance of an object storage system 114 and data services. In general, and in one or more implementations, e.g., ECS™, disk space is partitioned into a set of large blocks of fixed size called chunks; user data is stored in chunks. Chunks are shared, that is, one chunk can contain segments of multiple user objects; e.g., one chunk can contain mixed segments of some number of (e.g., three) user objects. A chunk manager 120 can be utilized to manage the chunks and their protection.

A CPU 122 and RAM 124 are shown for completeness; note that the RAM 124 can comprise at least some non-volatile RAM. The node includes storage devices such as disks 126, comprising hard disk drives and/or solid-state drives. It is noted that the storage devices can comprise volatile memory(s) or nonvolatile memory(s), or both volatile and nonvolatile memory(s). Examples of suitable types of volatile and non-volatile memory are described below with reference to FIG. 10. The memory (e.g., data stores, databases, tables, etc.) of the subject systems and methods is intended to comprise, without being limited to, these and any other suitable types of memory.

For a cluster that comprises a "GEO" zone of a geographically distributed storage system, at least one node, such as the node 104(2), includes or is coupled to reference tracking asynchronous replication logic 116 that synchronizes the cluster/zone 102 with other remote GEO zones, such as 118. Note that ECS™ implements asynchronous low-level replication, however the Active-Passive replication techniques herein are applicable to object level replication as well.

According to some embodiments, the nodes 102(1), 102(2) . . . 102(M) can be switched between active and passive modes. Any of the nodes 102(1), 102(2) . . . 102(M) and the zone 102 as a whole may be described as a data storage system, comprising at least one processor and at least one memory that stores executable instructions that, when executed by the at least one processor, facilitate performance of operations, including determining whether the data storage system 102 is in an active data storage mode or a passive data storage mode in connection with data (such as object 109a) stored on behalf of an application 109. Such determining can for example include checking an administrator setting for the zone 102.

In response to determining that the data storage system 102 is in an active data storage mode, any of the nodes 102(1), 102(2) . . . 102(M) can accept connections from the application 109, permitting the application 109 to store one or more new data objects 109a at the data storage system 102, and replicating the one or more new data objects 109a to other data storage systems 118 other than the data storage system 102. The nodes 102(1), 102(2) . . . 102(M) can furthermore participate in object ownership management for the application 109, and accept replicated application 109 data from one or more of the other data storage systems 118. As described further in connection with FIG. 6, replicating new data objects 109a to the other data storage systems 118 can comprise replicating the new data objects 109a to at least one first active data storage system that is in the active data storage mode, and replicating the one or more new data objects to at least one second passive data storage system that is in the passive data storage mode. Furthermore, replicating new data objects 109a to the other data storage systems 118 can comprise replicating the low-level chunks associated with objects 109a. The appropriate chunks for replication can be ascertained, e.g., by lookups performed at chunk manager 120 and/or asynchronous replication logic 116.

In response to determining that the data storage system 102 is in the passive data storage mode, any of the nodes 102(1), 102(2) . . . 102(M) can block at least storage of the one or more new data objects 109a by the application 109, while nonetheless accepting replicated data from one or more of the other data storage systems 118. Furthermore, nodes 102(1), 102(2) . . . 102(M) can optionally block connections from the application 109, thereby neither allowing creation of new objects 109a nor serving previously stored objects to application 109. Furthermore, any of the nodes 102(1), 102(2) . . . 102(M) in passive data storage mode can be omitted from object ownership management for the application 109, as described herein.

Figure 2:
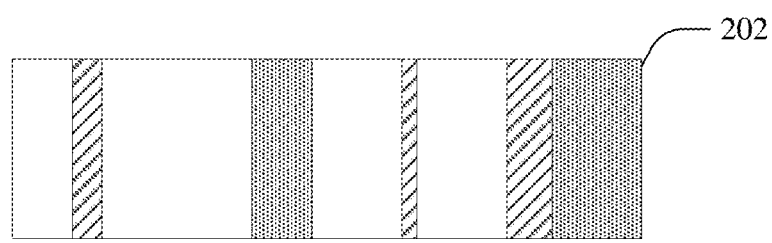
FIG. 2 illustrates an example layout of a chunk within an object storage system in accordance with an aspect of the specification.
Figure 2:
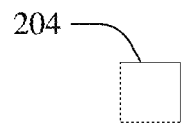
Figure 2:
Figure 2:

FIG. 2 illustrates an example layout 200 of a chunk within an object storage system in accordance with an aspect of the specification. In an aspect, disk space of the object storage system can be partitioned into a set of blocks of fixed size called chunks. As an example, the chunk size can be 128 MB. Typically, user data is stored in these chunks and the chunks are shared. As shown in FIG. 2, a chunk 202 can comprise segments of several user objects (e.g., object 1 segments 204, object 2 segments 206, and object 3 segments 208). It is noted that the chunk layout depicted in FIG. 2. is one example and the chunks can have most any other layout with segments from one or more user objects. Chunk content is modified in an append-only mode. When the chunk becomes full enough, it is sealed. After the chunk is sealed, its content is immutable.

In an aspect, objects and corresponding chunks can be protected locally at a zone 102 or node 102(1), 102(2) . . . 102(M) by employing a mirroring, a parity, and/or an erasure coding protection measure. During erasure coding, a chunk can be divided into k data fragments of equal size. To encode the chunk, redundant m coding fragments are created so that the system can tolerate the loss of any m fragments. The process of generating the coding fragments is called encoding. The process of data fragments recovery using available data and coding fragments is called decoding. As an example, the encoding operation can be represented with the equation below:

$$C_i = \Sigma_{j=1}^{k} C_{i,j} \qquad (1)$$

wherein, $$C_{i,j} = X_{i,j} * D_j \qquad (2)$$

and wherein, $X_{i,j}$ is a defined coefficient from a coding matrix (e.g., wherein i, j, and/or k can be most any integer). Further, j is an index assigned to the data fragment. It is noted that $D_j$ are independent data fragments and $C_i$ are coding fragments.

Additionally the systems and methods disclosed herein support geographically distributed setups (GEO) comprising two or more zones. GEO can be used to provide an additional protection of user data by means of replication. Replication can store object data at other zones. Replication can optionally be implemented at the chunk level, wherein a backup copy of a chunk stored in a primary zone can be replicated to one or more secondary zones. Each zone protects the chunks it stores. If a copy of a chunk becomes inaccessible, it can be recovered using its other copy. This process is called GEO recovery. In case of GEO erasure coding, remote backup copies of data chunks can be used as data fragments and coding fragments created for such data fragments are stored as coding chunks.

Figure 3:
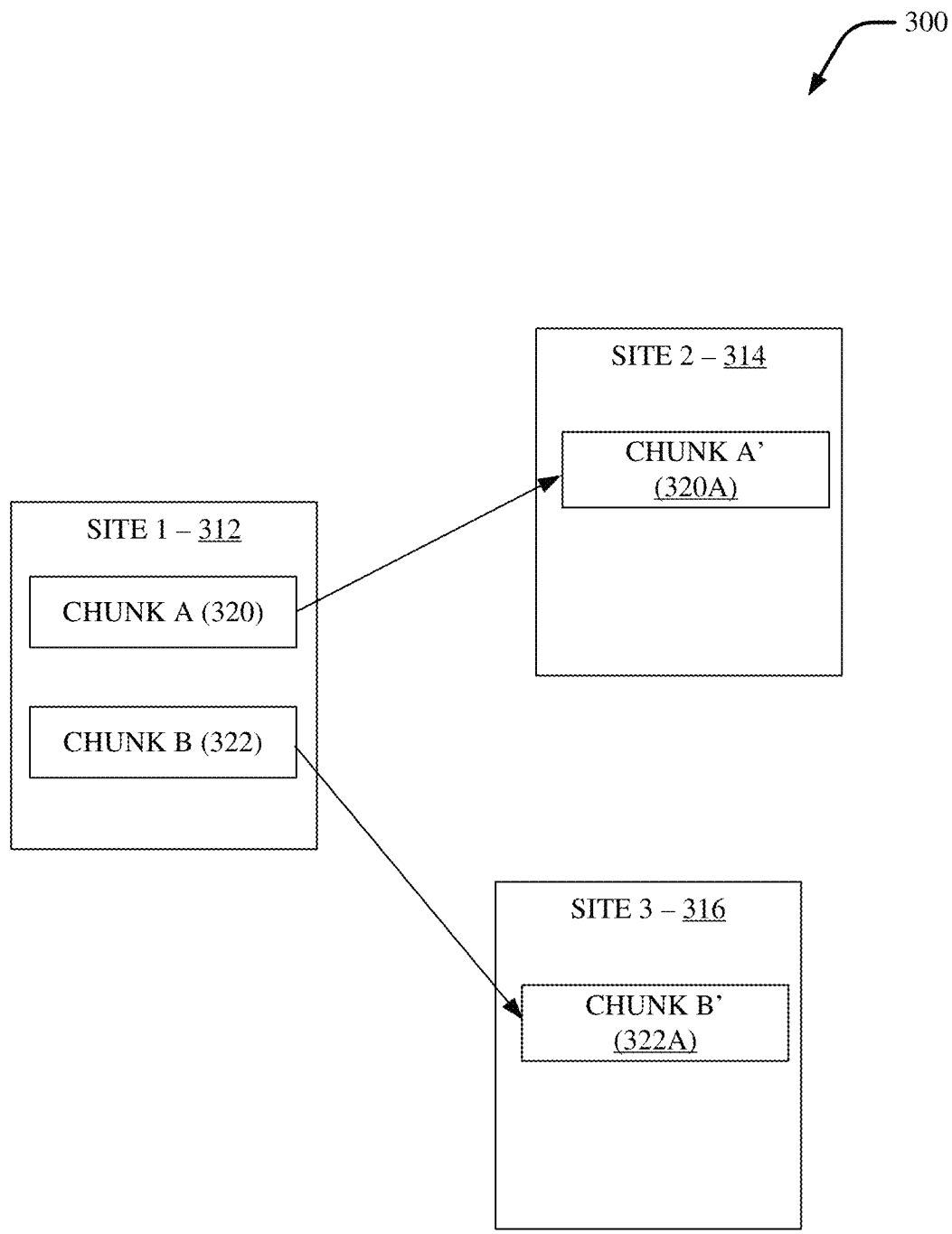
FIG. 3 illustrates an example of replication in a geographically distributed storage system in accordance with one or more embodiments described herein.

FIG. 3 illustrates an example of a geographically distributed storage system 300 which employs replication in accordance with one or more embodiments described herein. According to some exemplary embodiments, the geographically distributed storage system 300 comprises three sites (e.g., zones or clusters), site 1 312, site 2 314, and site 3 316. In some embodiments, site 1 312 stores the primary data chunk A 320 and primary data chunk B 322. To provide additional protection from loss or inaccessible of data, the user data is replicated. In the replication to single site mode, the primary data chunk A 320 is replicated at site 2 314 (e.g., storing a backup copy, chunk A' 320A at site 2 314) and the primary data chunk B 322 is replicated at site 3 316 (e.g., storing a backup copy, chunk B' 322A at site 3 316). The advantage is that if the primary site 312 is not accessible for any reason, the object data stored in chunks 320, 322 can be retrieved from remote sites (e.g., site 2 314 for data chunk A 320 and site 3 316 for data chunk B 322).

Figure 4:
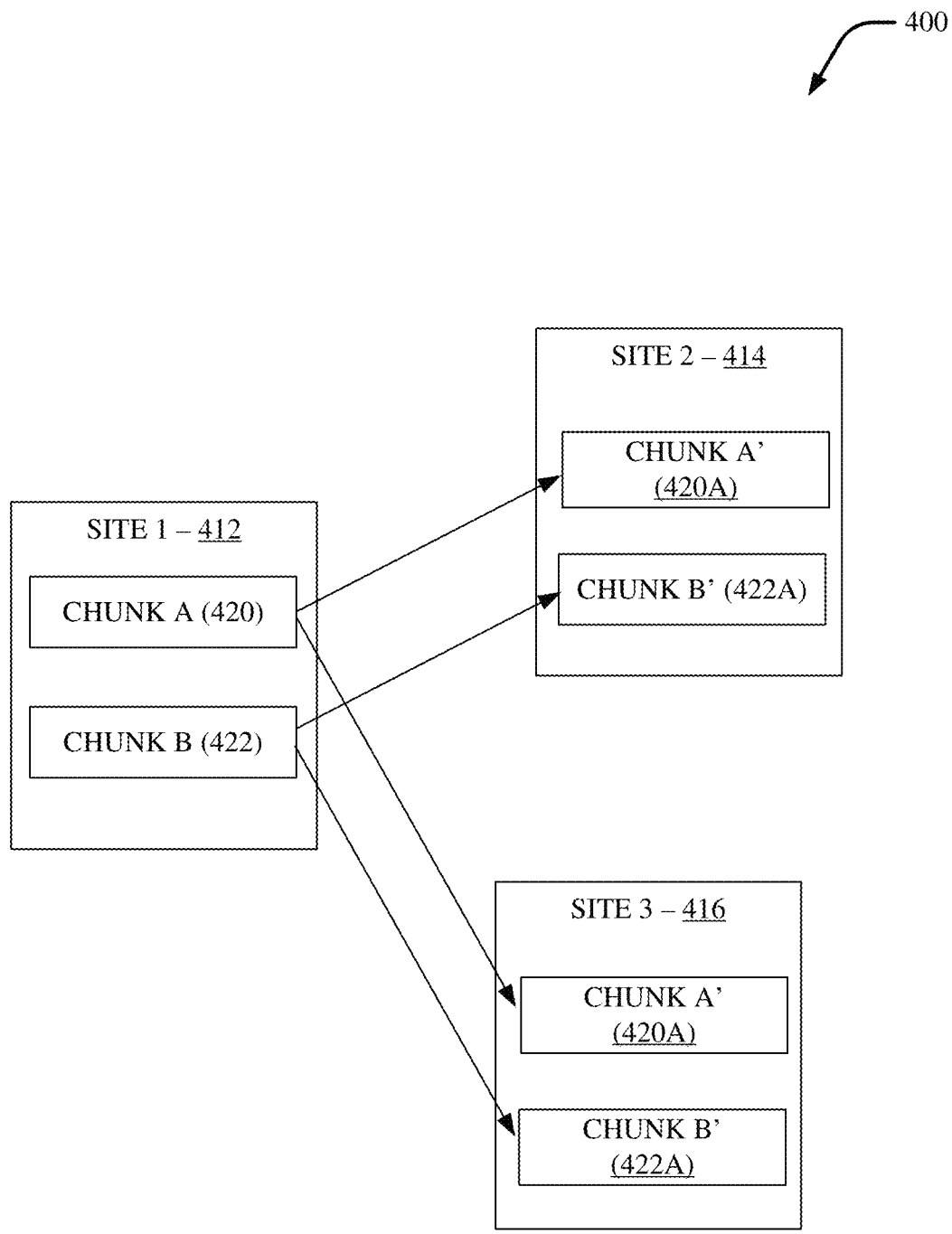
FIG. 4 illustrates an example of replication in a geographically distributed storage system in accordance with one or more embodiments described herein.

FIG. 4 illustrates an example of a geographically distributed storage system 400 which employs replication to all sites in accordance with one or more embodiments described herein. According to some exemplary embodiments, the geographically distributed storage system 400 comprises three sites (e.g., zones or clusters), site 1 412, site 2 414, and site 3 416. To provide additional protection from loss or inaccessible of data, the user data is replicated. In the replication to all sites mode, the primary data chunk A 420 is replicated at site 2 414 and site 3 416 (e.g., storing a backup copy at all sites within the GEO system, site 2 414 and site 3 416) and the primary data chunk B 422 is replicated at site 2 414 and site 3 416 (e.g., storing a backup copy at all sites within the GEO system, site 2 414 and site 3 416). The advantage is that if primary site or additional sites are not accessible for any reason, the object data stored in chunks 420, 422 can be retrieved from any available remote sites (e.g., site 2 414 or site 3 416). It should be noted, that the number sites in a GEO system is not limited to three and that hundreds of sites can be employed to store data and replicated data.

Figure 5:
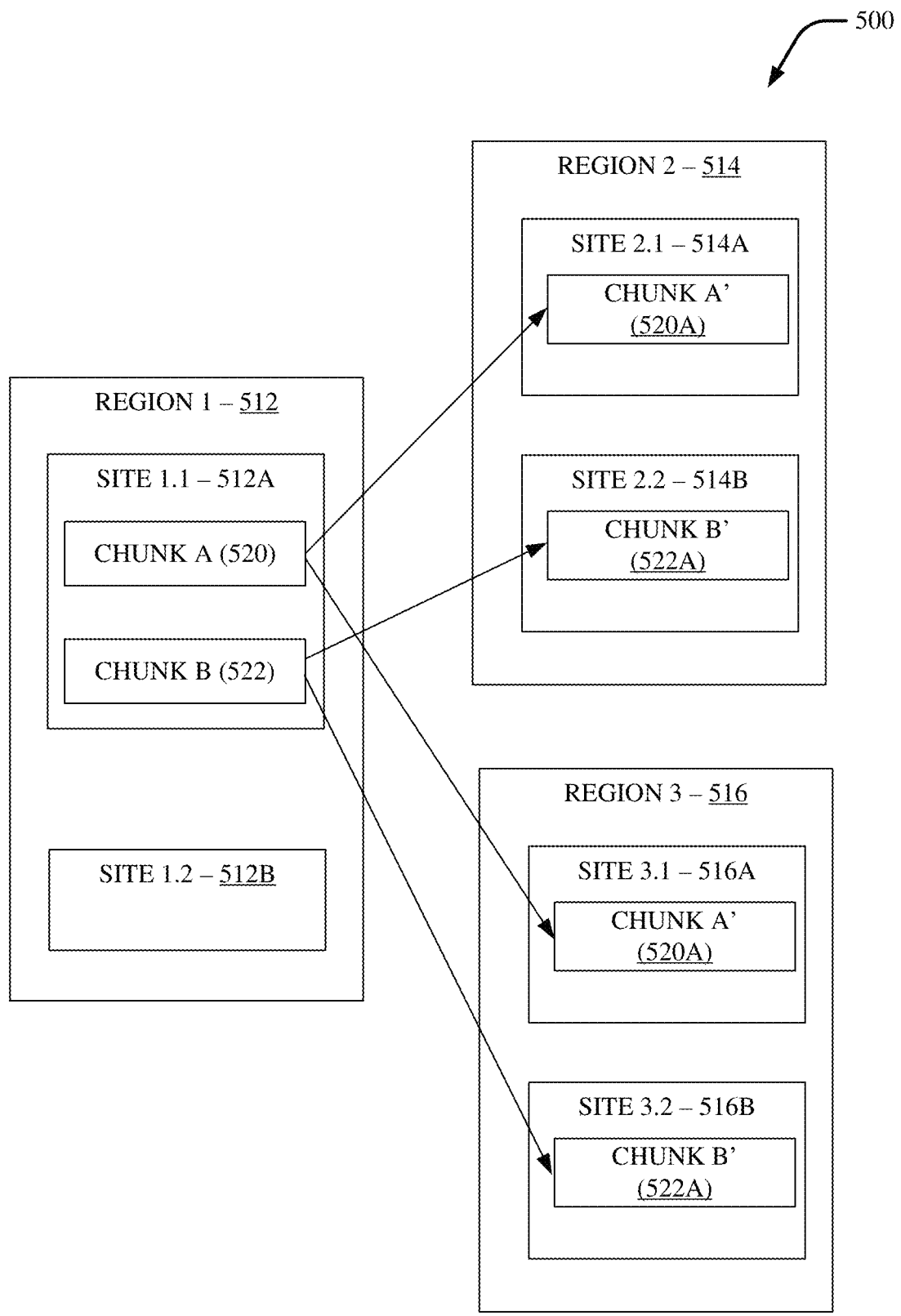
FIG. 5 illustrates an example of replication in a geographically distributed storage system in accordance with one or more embodiments described herein.

FIG. 5 illustrates an example of a geographically distributed storage system 500 which employs replication to regions in accordance with one or more embodiments described herein. When the number of sites reaches a threshold, the sites can be divided into multiple regions. According to some exemplary embodiments, the geographically distributed storage system 500 comprises three regions, region 1 512, region 2 514, and region 3 516. A region can comprise one or more sites. For example, region 1 512 comprises site 1.1 512A and site 1.2 512B, region 2 514 comprises site 2.1 514A and site 2.2 514B, and region 3 516 comprises site 3.1 516A and site 3.2 516B.

In the replication to regions mode, a copy of the chunk is replicated in one or more regions. According to the exemplary embodiment, the data chunk is replicated at all the regions and at a single site within each region. For example, a backup copy of chunk A 520 is stored at region 2 514 and at region 3 516, and a backup copy of chunk B 522 is stored at region 2 514 and at region 3 516. According to an exemplary embodiment, when the site 1.1 512A of region 1 512 creates chunk A 520, a backup copy of the chunk (e.g., chunk A' 520A is created in each remote region. Namely, backup chunk A' 520A is created in site 2.1 514A of region 2 514 and backup chunk A' 520A is create in site 3.1 516A of region 3 516. When site 1.1 512A of region 1 512 creates chunk B 522, a backup copy of the chunk is created in each remote region. Namely, backup chunk B' 522A is created in site 2.2 514B of region 2 514 and backup chunk B' 522A is created in site 3.2 516B of region 3 516. Thus, 3 copies (the number of regions) of each chunk are available.

One advantage of dividing sites into regions and storing a copy in each region is, to save hardware and memory resources by reducing the footprint of user data in a GEO environment. The data can be retrieved from a region that could be geographically hundreds of miles away. It is unlikely that the event that caused a failure at a site will cause failure at site in a different region. Thus, replication by region provides reliability of data access during a site failure, while reducing overall resources needed to replicate data. With replication to one or more regions, the system can tolerate loss of all but one region without data loss. Another advantage is that handling read requests for data can be reduced. Since read requests can be directed to a site that is continents away (e.g., Europe site requesting data read from Australia), the handling of such requests can take considerably more time. However, in the exemplary embodiment, read requests can be handled by a site having the copy of data chunk and located in adjacent region.

Figure 6:
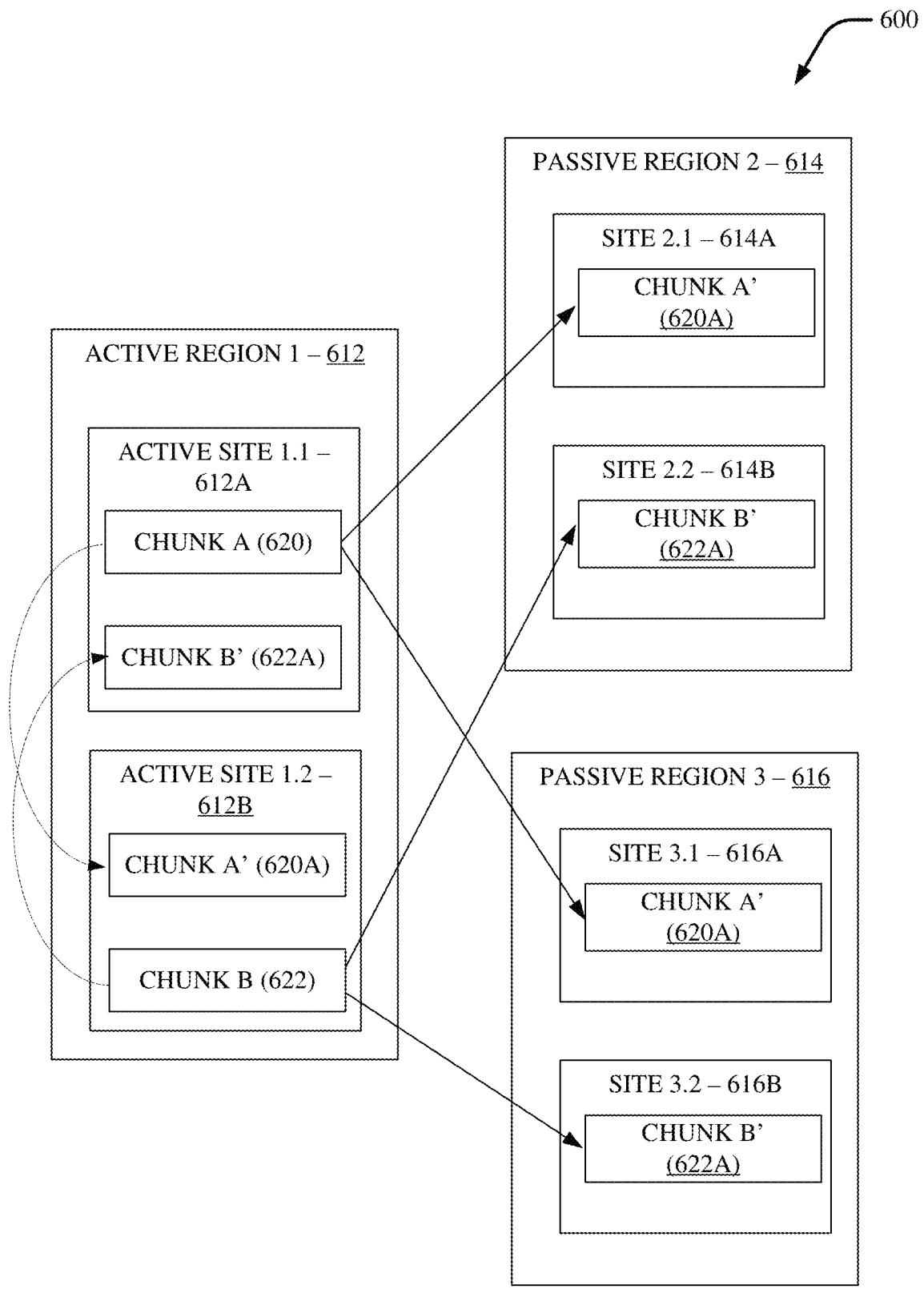
FIG. 6 illustrates an example of replication in a geographically distributed storage system implementing an active-passive model, in accordance with one or more embodiments described herein.

FIG. 6 illustrates an example of a geographically distributed storage system 600 which employs replication in active and passive modes, in accordance with one or more embodiments described herein. According to some exemplary embodiments, the geographically distributed storage system 600 comprises three regions, region 1 612, region 2 614, and region 3 616. Region 1 612A is an active region, while region 2 614 and region 3 616 are passive regions. A region can comprise one or more sites. For example, active region 1 612 comprises active site 1.1 612A and active site 1.2 612B, passive region 2 614 comprises passive site 2.1 614A and passive site 2.2 614B, and passive region 3 616 comprises passive site 3.1 616A and passive site 3.2 616B.

In the replication to active and passive regions mode, a copy of the chunk is replicated in both active and passive regions. According to the exemplary embodiment, the data chunk is replicated at sites in active regions and at a single site within each passive region. For example, a backup copy of chunk A 620 is stored at active site 1.2 612B, and at passive region 2 614, and at passive region 3 616, and a backup copy of chunk B 622 is stored at active site 1.1 612A, and at passive region 2 614, and at passive region 3 616. According to an exemplary embodiment, when the active site 1.1 612A of region 1 612 creates chunk A 620, a backup copy of the chunk (e.g., chunk A' 620A is created in active sites, as well as in passive regions). Namely, backup chunk A' 620A is created in active site 1.2 612B of region 1 612, site 2.1 614A of region 2 614, and site 3.1 616A of region 3 616.

When site 1.2 612B of region 1 612 creates chunk B 622, a backup copy of the chunk is created at sites in active regions and at a single site within each passive region. Namely, backup chunk B' 622A is created at site 1.1 612A of region 1 512, at site 2.2 614B of region 2 614, and at site 3.2 616B of region 3 616. Thus, in this example 3 copies of each chunk are available.

In the example illustrated by FIG. 6, there are 3 GEO regions, one active region and two passive regions. The three regions provide an example number, and any number of regions can be supported. Each region comprises a couple of sites. The choice of two sites per region is an example only and more or fewer sites can be supported in any given region. When site 1.1 612A of the active region 612 creates chunk A, one backup copy of the chunk is created within the active region 612 for HA needs. Since, in case of a disaster, any passive region can become active, a backup copy is also created within one site of each passive region. Namely, a copy of chunk A 620 is created in site 2.1 614A of the first passive region 614 and a copy of chunk A 620 is created in site 3.1 616A of the second passive region 616. When site 1.2 612B of the active region 612 creates chunk B, one backup copy of the chunk is created within the active region 612. A backup copy is also created within one site of each passive region. Namely, a copy is created in site 2.2 614B of the first passive region 614 and a copy is created in site 3.2 616B of the second passive region 616.

In further discussion of FIG. 6, an active site (such as active site 1.1 612A) that creates a new chunk (the primary site for the chunk) can protect the chunk locally, at the site level, using mirroring, parity, erasure coding, and/or other available protection techniques. The primary site (active site 1.1 612A) finds replication destination(s) within the active region 612. In case a number of chunk copies required in the active region 612 is fewer than the number of sites in the region 612, any applicable policy (e.g. a round-robin policy) can be used to find replication destinations. The primary site (active site 1.1 612A) replicates the chunk within the active region 612. All replication destinations (e.g., active site 1.2 612B) protect the chunk locally, at the site level, using minoring, parity, erasure coding, and/or other available protection techniques.

Similarly a primary site (active site 1.1 612A) can find a site in each passive region 614, 616 and replicate its chunk there. The destination passive sites (in this example, passive sites 2.1 614A and 3.1 616A) can also protect the chunk locally.

A geographically distributed storage system 600 which employs replication to active and passive regions can include features to handle permanent active site or active region failures. When an active site (active site 1.1 612A) is marked as a permanent site outage (PSO), the active region 612 is to recover the site's state using its region 612 resources. Region 612 resources can optionally be expanded via adding a new site. When an entire active region 612 fails, one of passive regions 614, 616 must be made active. The application 109 is switched to the new active region. The new active region (e.g., 614) becomes the rightful owner of all user data/application objects. The new active region 614 drives recovery of all user data/application objects. Besides, as a new active region, new active region 614 produces a required number of region-local copies of each chunk to meet the HA requirements, by replicating data to multiple sites 2.1 614A and 202 614B.

In another aspect, a data storage system represented by active site 1.1 612A, and the other data storage systems (sites) illustrated in FIG. 6 can be located at respective sites within active regions or passive regions, as shown. Active data storage systems 612A, 612B in the active data storage mode are located in the active region 612, and passive data storage systems 614A, 614B, 616A, 616B in the passive data storage mode are located in the passive regions 614 and 616, respectively.

In some examples, replicating new data objects (e.g., included in chunk A 620) to a first active data storage system can comprise replicating the new data objects to at most a defined number of the active data storage systems 612A, 612B, which need not necessarily include all of the active sites in active region 612. The replicating of new data objects to at most the defined number of the active data storage systems 612A, 612B can comprise applying a distribution protocol, such as round robin or otherwise, to select among the active data storage systems 612A, 612B.

Meanwhile, replicating the new data objects to a passive data storage system can comprise replicating the new data objects to at least one of the passive data storage systems in each of the passive regions, for example, by replicating to sites 614A, 616A in regions 614 and 616. It will be appreciated that more or fewer passive sites can also be selected for replication in some embodiments.

Active data storage systems can participate in object ownership management for the application 109. In circumstances wherein a data storage system, such as active site 1.1 612A is designated as an owner of one or more new data objects, i.e. objects which can be included in chunk A 620 stored at the data storage system 612A by the application 109, active site 101 612A can handle requests related to the one or more new data objects (included in chunk A 620), as such requests are forwarded from, e.g., other active data storage systems such as 612B.

In response to a site outage being determined to have taken place at another active site, e.g., a first active data storage system represented by active site 1.2 612B, an active site 1.1 612A can participate in object ownership management by selecting, from among one or more other active data storage systems/sites, a new owner for one or more data objects owned by the at least one first active data storage system (active site 1.2 612B). In FIG. 6 the only other active site available, should active site 1.2 612B experience an outage, would be active site 1.1 612A. In other embodiments, additional active sites can be available for selection, and selecting from among the other active data storage systems can include participating in an election process with the other active data storage systems—e.g., the other active sites included in active region 612. Passive data storage systems in regions 614 and 6164 need not participate in object ownership management, and therefore need not be included in the election process. In response to a return of the at least one first active data storage system (active site 1.2 612B) to an operational state, active site 1.1 612A can participate in object ownership management by reconciling conflicts between the new owner and the at least one first active data storage system (active site 1.2 612B).

Under some circumstances, a site or region can switch from passive to active. For example, in response to a failure of multiple data storage systems, e.g., failure of all of the active sites in the active region 612, a passive data storage system (passive site 614A) can switch the from the passive data storage mode to the active data storage mode. Passive site 614A can initiate replication of application data (e.g., all chunks including application data) to data storage systems, such as passive site 2.2 614B within a same region 614 as the data storage system 614A. This can allow passive region 614 to take over as the active region for an application.

Figure 7:
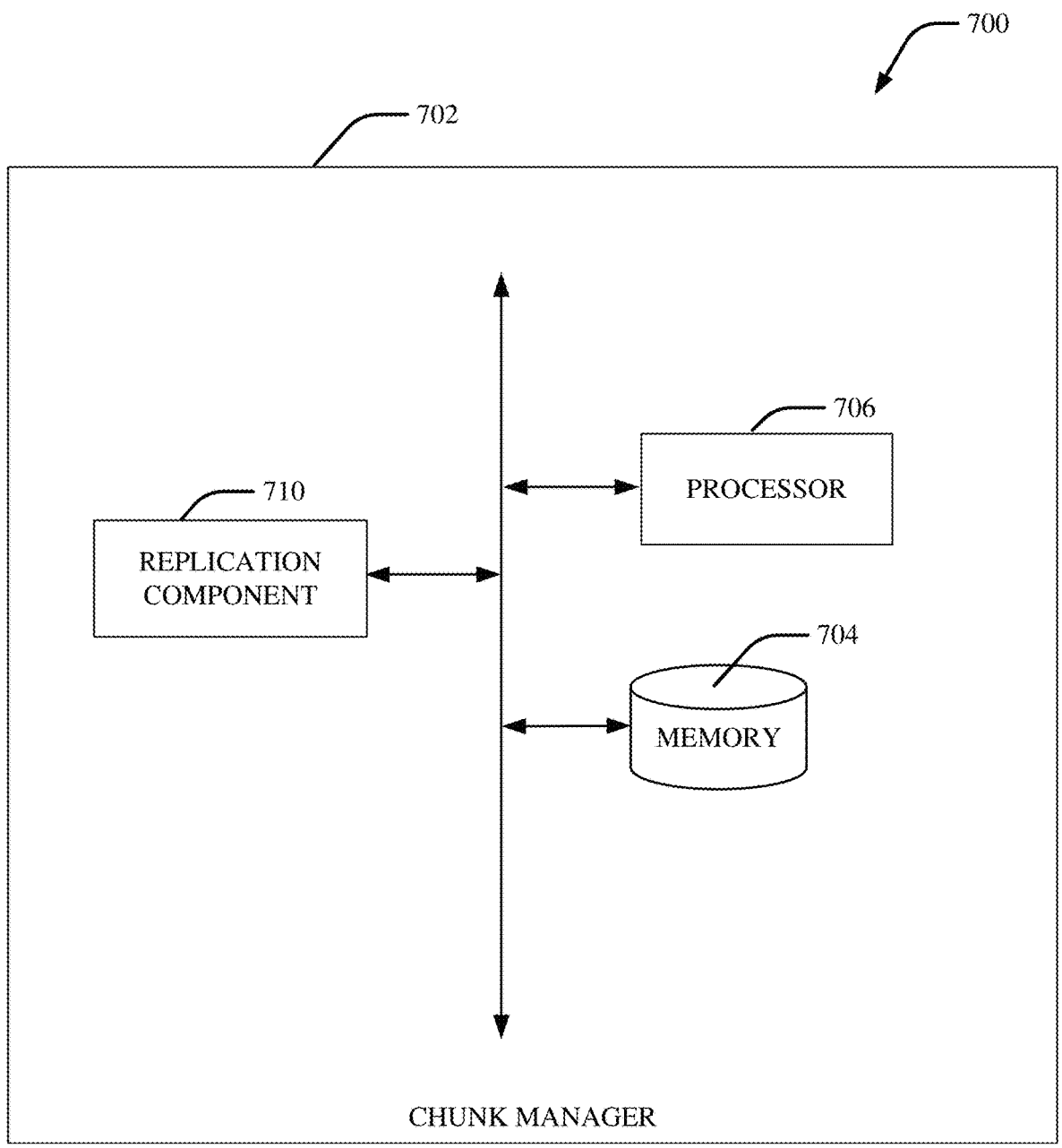
FIG. 7 illustrates an example of a chunk manager operational in a geographically distributed storage system accordance with one or more embodiments described herein.

FIG. 7 illustrates an example of a chunk manager 702 operational in a geographically distributed storage system 700 accordance with one or more embodiments described herein. In some embodiments, the chunk manager 702 comprises a replication component 710, a processor 706, and memory 704 that are communicatively coupled to each other. In some embodiments, the chunk manager 702 processes replication of data employing the replication component 710. In some embodiments, when a data chunk is created, the data chunk is replicated using, e.g., the active-passive replication mode described in connection with FIG. 6. In some embodiments, employing the processor 706 and the memory 704, the replication component 710 stores a first data chunk (e.g., the primary data chunk) locally at a primary active site of a primary active region in a geographically diverse data storage system. The replication component 710 then replicates the first data chunk to one or more additional active sites of the primary active region, and optionally to other active sites in other active regions. The replication component 710 then replicates the first data chunk to one or more additional passive sites in passive regions. In some embodiments, the determination of the region and the site within the region that will store the copy of the first data chunk can be based on geography, available storage space at site, using a round robin scheme to cycle through all the sites or a combination therefrom.

In some embodiments, the primary site (e.g., replication component 710 of primary site) scans available regions to identify suitable active and passive regions to store copies of data chunks. In some embodiments, the replication component 710 identifies suitable sites within active and passive regions, and replicates the data chunk at the active and passive sites. The active and passive sites protect replicated data chunks locally using for example, but not limited to, mirroring, parity or erasure coding techniques.

Aspects of the processor 706 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, memory 704 can store computer executable components and instructions. It is noted that the memory 704 can comprise volatile memory(s) or nonvolatile memory(s) or can comprise both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory. In some embodiments, the chunk manager 702 can reside in a zone and be communicatively coupled to one or more other zones. In some embodiments, a single site can be designated as primary site within the geographical distributed storage system. The primary site can determine the region boundaries and threshold limits for sites and region. For example, the processor 706 of the primary site monitors the storage capacity of each sites to determine if a new region needs to be defined (e.g., when number of sites reach a threshold, the sites are divided into regions).

Figure 8:
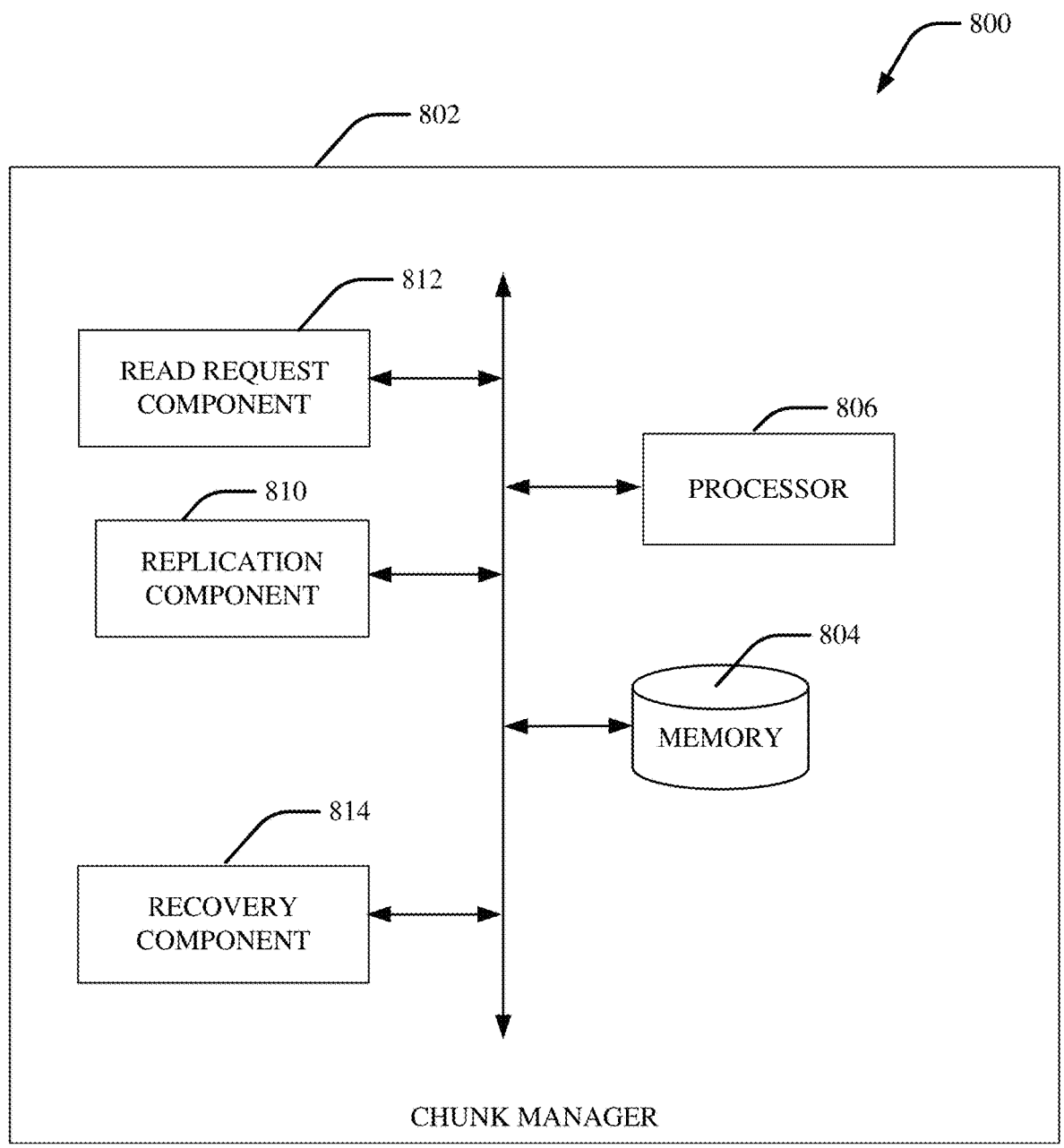
FIG. 8 illustrates an example of a chunk manager operational in a geographically distributed storage system accordance with one or more embodiments described herein.

FIG. 8 illustrates an example of the chunk manager 802 operational in a geographically distributed storage system 800 accordance with one or more embodiments described herein. Repetitive description of like elements employed in respective embodiments is omitted for sake of brevity. In some embodiments, the chunk manager 802 can further comprise a read request component 812 that processes read requests for a data portion of the chunk. If the primary data chunk is not available or inaccessible, the read request component 812 scans for a copy of the data chunk. The read request component 812 can use a secondary data chunk, such as a data chunk retrieved from another site, to serve a read request.

In some embodiments, the chunk manager 802 can further comprise a recovery component 814 that handles data chunk recovery in the event of a site failure that causes the data chunk to become inaccessible. In the event of site failure, several data chunks are lost. The recovery of impacted chunks can be handled one at a time by the recovery component 814. The recovery comprises recreating a site using available remaining available sites. For each chunk, a primary recovery site is found among the remaining sites to drive the recovery of the data chunk. Based on availability, the primary site, a secondary site or a tertiary site can serve as the primary recovery site to drive the recovery of the data chunk. In some embodiments, all missing chunk copies can be re-created within the original regions. In the event of region failure, a primary recovery region is found among the remaining regions to drive the recovery of the missing chunks. Based on availability, the primary region, secondary region or tertiary region can serve as the primary recovery region to drive the recovery of the data chunk. In the event the primary site is not available or inaccessible, the secondary site becomes the primary site, the tertiary site becomes the secondary site, and a new site is selected as the tertiary site.

Figure 9:
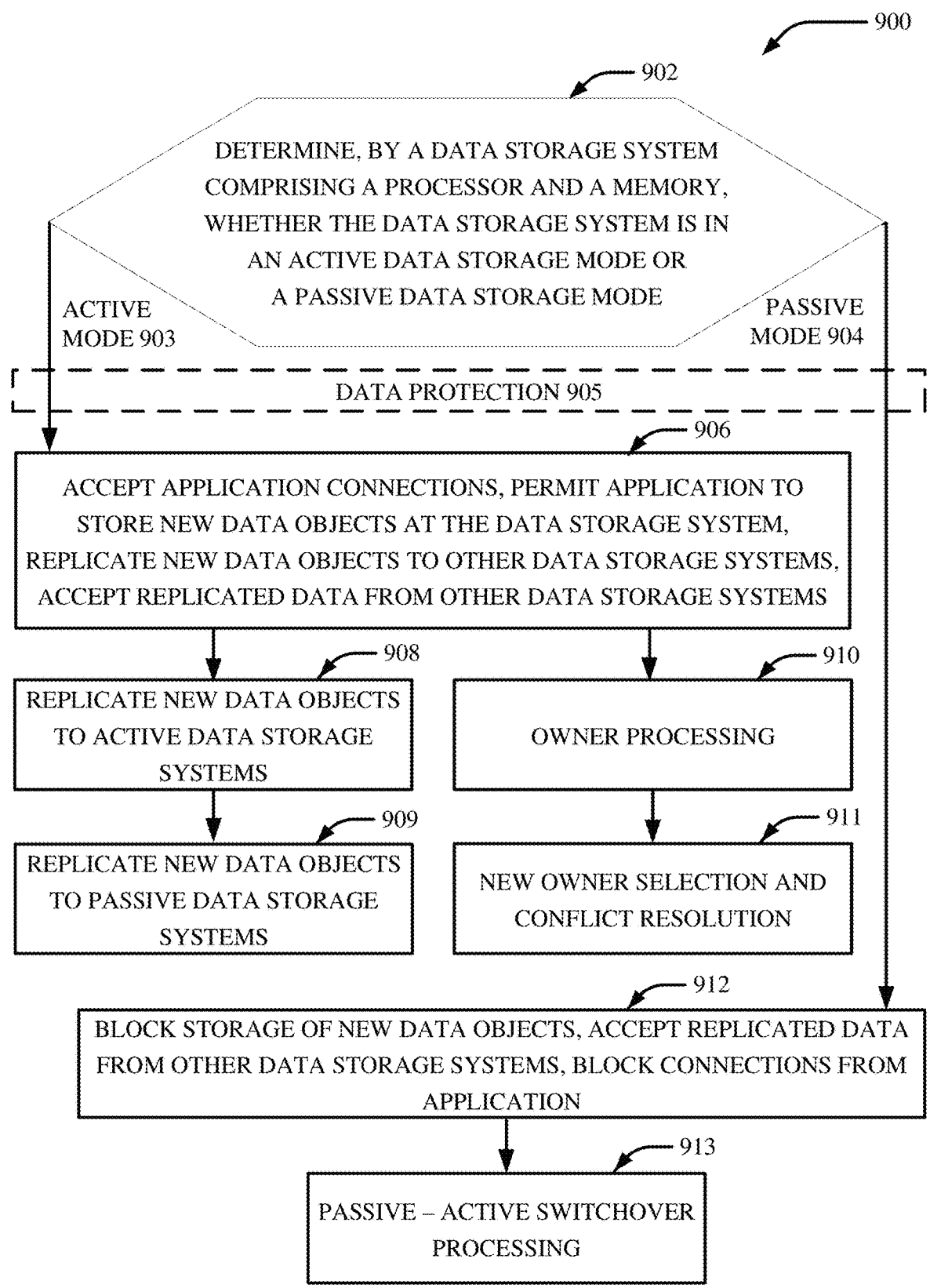
FIG. 9 depicts a diagram of an example, non-limiting computer implemented method that facilitates replication of data according to an active-passive model in geographically distributed storage system.

FIG. 9 depicts a diagram of an example, non-limiting computer implemented method that facilitates replication of data according to an active-passive model in geographically distributed storage system. Repetitive description of like elements employed in other embodiments described herein is omitted for sake of brevity. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts, determining, by a data storage system comprising a processor and a memory, whether the data storage system is in an active data storage mode or a passive data storage mode. For example, with reference to FIG. 6, a data storage system comprising any of the sites in region 612, 614, or 616 can refer to an administrative setting that indicates whether the site is in an active data storage mode or a passive data storage mode. A data storage system can optionally be in active storage mode for some applications, and in passive storage mode for other applications. Thus a data storage system can perform operation 902 in connection with data stored on behalf of an application, such as application 109. Alternatively, in some instances, a data storage system can be in either active or passive mode for all applications.

If the data storage system determines it is in active mode, the illustrated method continues via arrow 903. If the data storage system determines it is in passive mode, the illustrated method continues via arrow 904. It is also noted that any given data storage system can operate in active mode occasionally and in passive mode occasionally.

Operation 905 depicts data protection 905. Regardless of whether the data storage system is in active or passive mode, the data storage system can perform data protection operations at block 905 or at any time in the illustrated method. The data storage system can protect data objects locally at the data storage system using, for example, one or more of a mirroring, a parity, and an erasure coding protection measure.

Operation 906 depicts, in response to determining that the data storage system is in the active data storage mode, such as site 1.1 612A in FIG. 6, accepting connection(s) from the application 109, permitting the application 109 to store one or more new data objects 109a at the data storage system 612A, replicating the one or more new data objects 109a to other data storage systems such as site 1.2 612B and site 2.1 614A, which are sites other than the data storage system 612A, and accepting replicated data such as chunk B' 622A from one or more of the other data storage systems, such as from site 1.2 612B. The actions that the site 1.1 612A can take in connection with replicating data to active and passive sites are illustrated in blocks 908 and 909. The actions that the site 1.1 612A can take in connection with managing objects and ensuring no conflicts, even in the case of TSO, are illustrated in blocks 910 and 911.

Operation 908 depicts replicating data to active data storage systems, such as site 1.2 612B in FIG. 6. In general, site 1.1 612A can replicate new data objects 109A, created by application 109, to other data storage systems including both active and passive sites. Site 1.1 612A can replicate the one or more new data objects 109a to at least one first active data storage system that is in the active data storage mode, such as site 1.2 612B.

Operation 909 depicts replicating data to passive data storage systems, such as site 2.1 614A in FIG. 6. Site 1.1 612A can replicate the one or more new data objects 109 to at least one second passive data storage system that is in the passive data storage mode, such as passive site 2.1 614A.

Referring back to operations 908 and 909, it will be appreciated from FIG. 6 that the data storage system at site 1.1 612A and the other data storage systems, such as site 1.2 612B and site 2.1 614A are located at respective sites within active regions such as 612 or passive regions such as 614, and active data storage systems in the active data storage mode are located in the active regions, wherein passive data storage systems in the passive data storage mode are located in the passive regions. Replicating to active and passive regions can be done according to different protocols.

For example, replicating the one or more new data objects 109a to the at least one first active data storage system such as site 1.2 612B can comprise replicating the one or more new data objects 109a to at most a defined number of the active data storage systems. Any predefined number can be used, and the number can be less than or equal to the total available sites in active mode. A distribution protocol, such as round robin or any desired protocol, can be applied to select which among the active data storage systems will receive replicated data for a particular application.

In contrast, replicating the one or more new data objects 109a, at operation 909 to at least one second passive data storage system (such as, but not limited to site 2.1 614A) can comprise replicating the one or more new data objects 109a to at least one of the passive data storage systems in each of the passive regions 614, 616. In other words, a replicate by region approach, introduced in FIG. 5, can optionally be used in connection with replication to passive sites.

Operation 910 depicts owner processing, whereby an active data storage system can participate in object ownership management. For example, when the data storage system at site 1.1 612A is designated as an owner of the one or more new data objects 109a stored at the site 1.1 612A by the application 109, the site 1.1 612A can handle requests related to the one or more new data objects 109a forwarded from other active sites, e.g., the at least one first active data storage system a site 1.2 612B.

Operation 911 depicts new owner selection and conflict resolution. Operation 911 will generally be performed responsive to a TSO or PSO of a site that was previously the owner of an object. Operation 911 is another example aspect of participating in object ownership management. For example, if site 1.2 612B experiences a TSO, then in response to a site outage being determined to have taken place at the at least one first active data storage system 612B, site 1.1 612A can select, from among one or more other active data storage systems, e.g., in region 612, a new owner for one or more data objects owned by the at least one first active data storage system 612B. Selecting the new owner can include any selection method, e.g., site 1.1 612A can optionally participate in an election process with the one or more other active data storage systems (e.g., in region 612). The passive data storage systems need not be included in the election or other new owner selection process. In response to a return of the at least one first active data storage system at site 1.2 612B to an operational state, site 1.1 612A, if it served as a temporary owner, can reconcile conflicts between the new owner (site 1.1 612A) and the at least one first active data storage system (site 1.2 612B).

Operation 912 depicts, in response to determining that the data storage system at, e.g., site 2.1 614A is in the passive data storage mode, blocking at least storage of the one or more new data objects 109*a* by the application 109, and accepting replicated data 620A from one or more of the other data storage systems, such as site 1.1 612A. In further response to determining that the data storage system at site 2.1 614A is in the passive data storage mode, site 2.1 614A can block connections from the application 109. Site 2.1 614A is used in this discussion because it is shown in passive mode in FIG. 6, however other sites, such as site 1.1 612A can also be configured, or re-configured in passive mode, thereby serving in active mode at one time and in passive mode at another time.

Operation 913 depicts passive to active switchover processing. Similar to operation 911, operation 913 will generally be performed responsive to a TSO or PSO of an active site that was previously the owner of an object. In response to a failure the owner site, or of multiple of the other data storage systems, e.g., all active sites for an application, a site 2.1 614A in passive mode can switch the data storage system at site 2.1 614A from the passive data storage mode to the active data storage mode. In such a circumstance, site 2.1 614A can also initiate replication of application data at data storage systems located at sites within a same region 614 as the data storage system 614A. The region 614 and all sites therein can optionally switch from passive to active mode and can begin replicating data as described herein for active regions.

Figure 10:
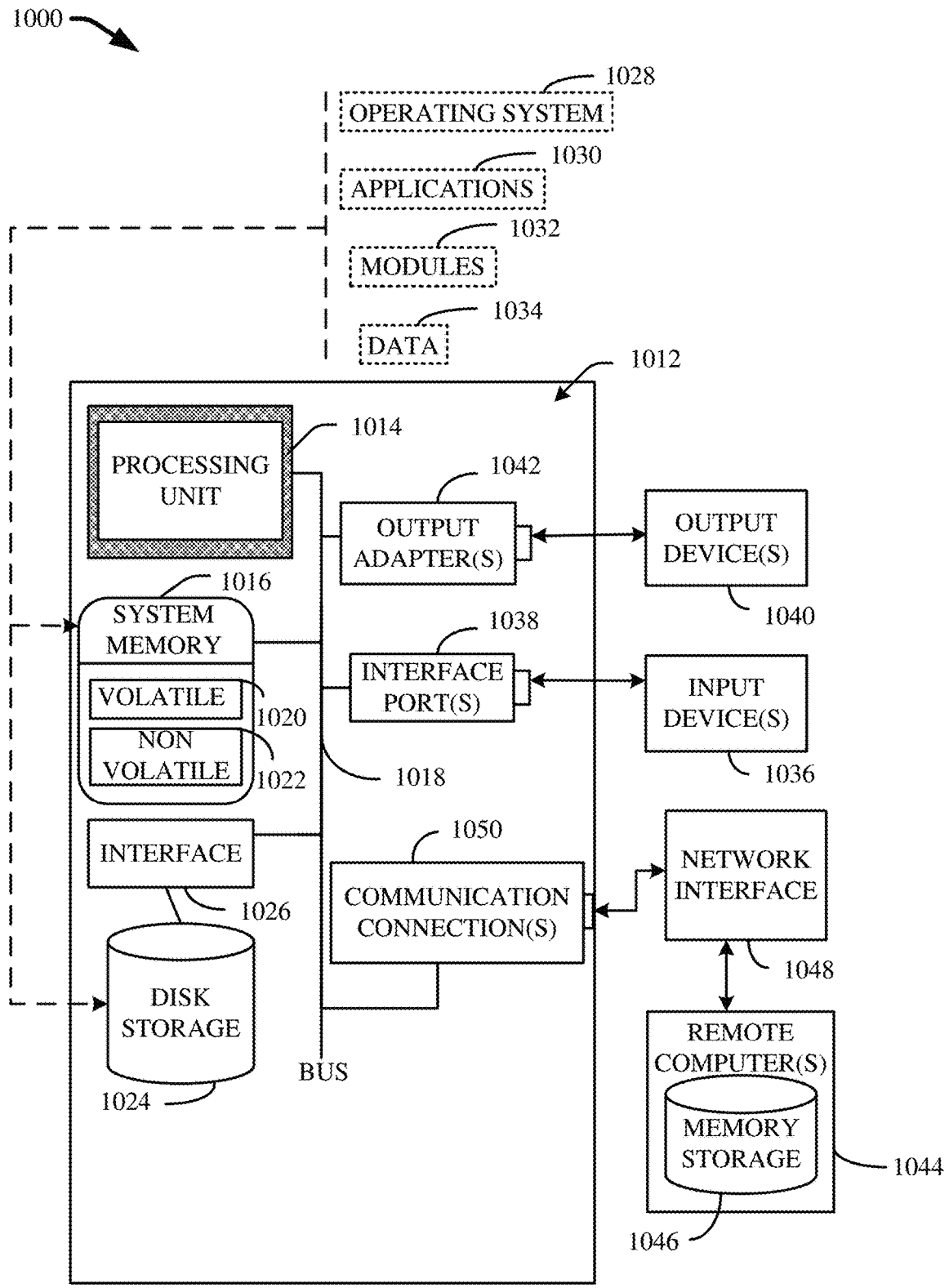
FIG. 10 illustrates a block diagram of an example computer operable to provide a data storage system with active and passive modes.

FIG. 10 illustrates a block diagram of an example computer operable to provide a data storage system with active and passive modes. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference to FIG. 10, a block diagram of a computing system 1000 operable to execute the disclosed systems and methods is illustrated, in accordance with an embodiment. Computer 1012 comprises a processing unit 1014, a system memory 1016, and a system bus 1018. As an example, the component(s), server(s), client(s), node(s), cluster(s), system(s), zone(s), module(s), agent(s), engine(s), manager(s), and/or device(s) disclosed herein with respect to systems 400-1000 can each include at least a portion of the computing system 1000. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), comprising routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth®, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 1000 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE 1002.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic 11BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data storage system, comprising:
   at least one processor; and
   at least one memory that stores executable instructions that, when executed by the at least one processor, facilitate performance of operations, comprising:
   determining whether the data storage system is in an active data storage mode or a passive data storage mode in connection with data stored on behalf of an application;
   in response to determining that the data storage system is in the active data storage mode, accepting a connection from the application, permitting the application to store one or more new data objects at the data storage system, replicating the one or more new data objects to other data storage systems other than the data storage system, participating in object ownership management for the application, and accepting replicated data from one or more of the other data storage systems,
   wherein the replicating the one or more new data objects to the other data storage systems comprises replicating the one or more new data objects to at least one first active data storage system that is in the active data storage mode, and replicating the one or more new data objects to at least one second passive data storage system that is in the passive data storage mode,
   wherein the replicating the one or more new data objects to the at least one first active data storage system further comprises replicating the one or more new data objects to at most a defined number of active data storage systems,
   wherein participating in object ownership management for the application comprises, in response to a site outage being determined to have taken place at the at least one first active data storage system, selecting, from among one or more other active data storage systems, a new owner for one or more data objects owned by the at least one first active data storage system,
   wherein the selecting, from among the one or more other active data storage systems, the new owner for the one or more data objects owned by the at least one first active data storage system comprises participating in an election process with the one or more other active data storage systems, and wherein the at least one second passive data storage system is not included in the election process, wherein the data storage system and the other data storage systems are located at respective sites within active regions or passive regions, wherein active data storage systems in the active data storage mode are located in the active regions, wherein passive data storage systems in the passive data storage mode are located in the passive regions; and in response to determining that the data storage system is in the passive data storage mode, blocking at least storage of the one or more new data objects by the application, and accepting replicated data from one or more of the other data storage systems.

2. The data storage system of claim 1, wherein the operations further comprise:

in further response to determining that the data storage system is in the passive data storage mode, blocking the connection from the application.

3. The data storage system of claim 1, wherein:

the replicating the one or more new data objects to at least one second passive data storage system comprises replicating the one or more new data objects to at least one of the passive data storage systems in each of the passive regions.

4. The data storage system of claim 1, wherein the replicating the one or more new data objects to at most the defined number of the active data storage systems comprises applying a distribution protocol to select among the active data storage systems.

5. The data storage system of claim 1, wherein the operations further comprise:

protecting the one or more new data objects locally at the data storage system using one or more of a mirroring, a parity, and an erasure coding protection measure.

6. The data storage system of claim 1, wherein the data storage system is designated as an owner of the one or more new data objects stored at the data storage system by the application, and wherein participating in object ownership management for the application comprises handling requests related to the one or more new data objects forwarded from the at least one first active data storage system.

7. The data storage system of claim 1, wherein the operations further comprise:

in response to a failure of multiple of the other data storage systems, switching the data storage system from the passive data storage mode to the active data storage mode and initiating replication of application data at data storage systems located at sites within a same region as the data storage system.

8. A method, comprising:

when a data storage system is in an active data storage mode in connection with data stored on behalf of an application, accepting, by the data storage system, a connection from the application, permitting, by the data storage system, the application to store one or more new data objects at the data storage system, replicating, by the data storage system, the one or more new data objects to other data storage systems other than the data storage system, participating, by the data storage system, in object ownership management for the application, and accepting, by the data storage system, replicated data from one or more of the other data storage systems, wherein participating in the object ownership management for the application comprises, in response to a site outage being determined to have taken place at the data storage system in the active data storage mode, selecting, from among one or more of the other data storage systems that are in the active data storage mode, a new owner for one or more data objects owned by the data storage system in the active data storage mode, wherein replicating, by the data storage system, the one or more new data objects to the other data storage systems comprises replicating the one or more new data objects to at least one first active data storage system that is in the active data storage mode, and replicating the one or more new data objects to at least one second passive data storage system that is in the passive data storage mode, wherein the replicating the one or more new data objects to the at least one first active data storage system further comprises replicating the one or more new data objects to at most a defined number of active data storage systems, wherein the data storage system and the other data storage systems are located at respective sites within active regions or passive regions, wherein active data storage systems in the active data storage mode are located in the active regions, wherein passive data storage systems in the passive data storage mode are located in the passive regions;

in response to a return of the data storage system to an operational state, reconciling conflicts between the new owner and the data storage system in the active data storage mode; and when the data storage system is in a passive data storage mode in connection with data stored on behalf of the application, blocking, by the data storage system, at least storage of the one or more new data objects by the application, and accepting, by the data storage system, replicated data from one or more of the other data storage systems.

9. The method of claim 8, further comprising, when the data storage system is in the passive data storage mode, blocking, by the data storage system, the connection from the application.

10. The method of claim 8, wherein:

the replicating, by the data storage system, the one or more new data objects to at least one second passive data storage system comprises replicating the one or more new data objects to at least one of the passive data storage systems in each of the passive regions.

11. The method of claim 8, wherein the data storage system is designated as an owner of the one or more new data objects stored at the data storage system by the application, and further comprising handling, by the data storage system, requests related to the one or more new data objects forwarded from the at least one first active data storage system.

12. The method of claim 8, further comprising, switching the data storage system from the passive data storage mode to the active data storage mode in response to a failure of multiple of the other data storage systems, and initiating replication of application data at data storage systems located at sites within a same region as the data storage system.

13. The method of claim 8, wherein the replicating the one or more new data objects to at most the defined number of the active data storage systems comprises applying a distribution protocol to select among the active data storage systems.

14. The method of claim 8, wherein the replicating the one or more new data objects to at least one second passive data storage system comprises replicating the one or more new data objects to at least one of the passive data storage systems in each of the passive regions.

15. A non-transitory machine-readable medium, comprising executable instructions that, when executed by a processor, facilitate performance of operations, comprising:
- determining whether a data storage system is in an active data storage mode or a passive data storage mode in connection with data stored on behalf of an application;
- in response to determining that the data storage system is in the active data storage mode, accepting a connection from the application, permitting the application to store one or more new data objects at the data storage system, replicating the one or more new data objects to other data storage systems other than the data storage system, and accepting replicated data from one or more of the other data storage systems,
- wherein the replicating the one or more new data objects to the other data storage systems comprises replicating the one or more new data objects to at least one first active data storage system that is in the active data storage mode, and replicating the one or more new data objects to at least one second passive data storage system that is in the passive data storage mode,
- wherein the replicating the one or more new data objects to the at least one first active data storage system further comprises replicating the one or more new data objects to at most a defined number of active data storage systems,
- wherein the replicating the one or more new data objects to the at least one second passive data storage system comprises replicating the one or more new data objects to at least one of passive data storage systems in each of passive regions,
- wherein the data storage system and the other data storage systems are located at respective sites within active regions or the passive regions, wherein active data storage systems in the active data storage mode are located in the active regions, wherein the passive data storage systems in the passive data storage mode are located in the passive regions; and
- in response to determining that the data storage system is in the passive data storage mode, blocking at least storage of the one or more new data objects by the application, and accepting replicated data from one or more of the other data storage systems.

16. The non-transitory machine-readable medium of claim 15, wherein the operations further comprise:
- in further response to determining that the data storage system is in the passive data storage mode, blocking the connection from the application.

17. The non-transitory machine-readable medium of claim 15, wherein the data storage system is designated as an owner of the one or more new data objects stored at the data storage system by the application, and wherein the operations further comprise handling requests related to the one or more new data objects forwarded from the at least one first active data storage system.

18. The non-transitory machine-readable medium of claim 15, wherein the operations further comprise, in response to a failure of multiple of the other data storage systems, switching the data storage system from the passive data storage mode to the active data storage mode and initiating replication of application data at data storage systems located at sites within a same region as the data storage system.

19. The non-transitory machine-readable medium of claim 15, wherein the replicating the one or more new data objects to at most the defined number of the active data storage systems comprises applying a distribution protocol to select among the active data storage systems.

20. The non-transitory machine-readable medium of claim 15, wherein the operations further comprise:
- protecting the one or more new data objects locally at the data storage system using at least one of a mirroring, a parity, or an erasure coding protection measure.

* * * * *